3,525,122
APPARATUS FOR PELLETIZING CARBON BLACK
Richard E. Driscoll, Monroe, La., and Leon Gober, Jr., El Dorado, Ark., assignors to Cities Service Company, New York, N.Y., a corporation of Delaware
Filed Feb. 28, 1968, Ser. No. 708,847
Int. Cl. B29b 1/02
U.S. Cl. 18—1      4 Claims

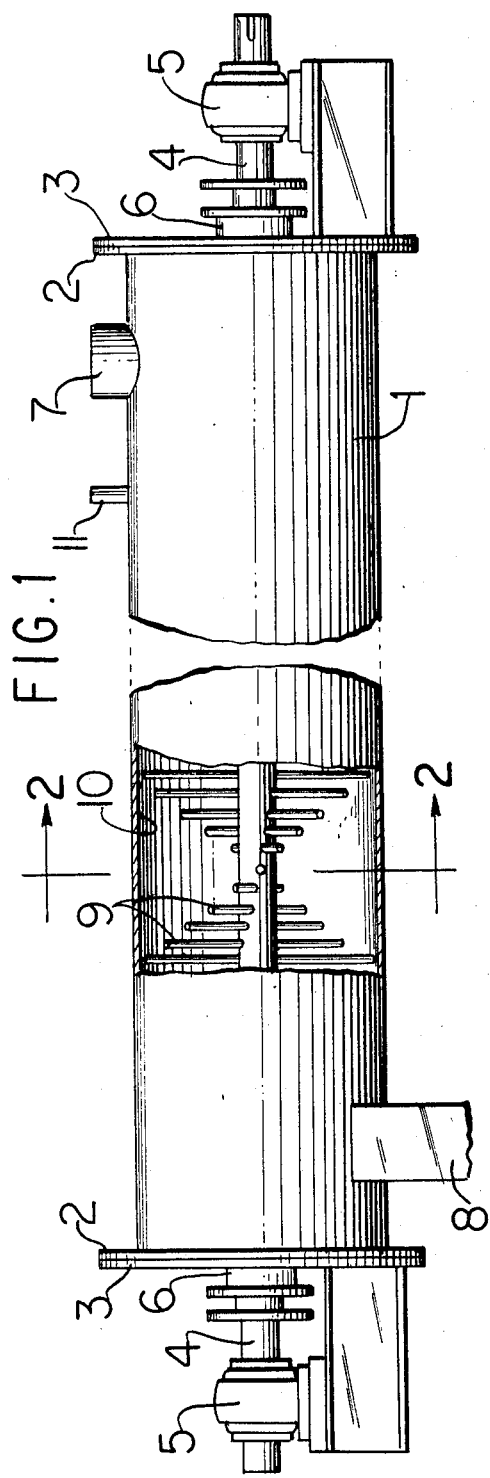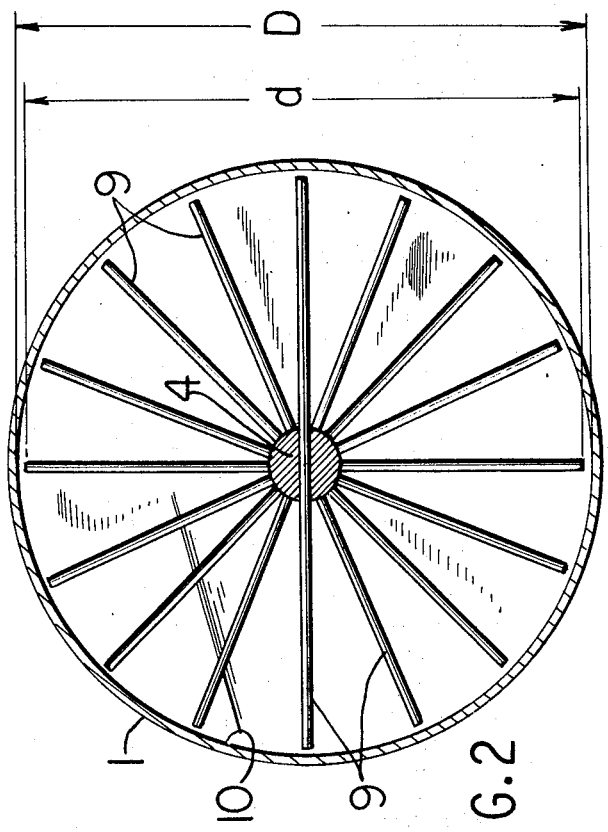
INVENTORS
RICHARD E. DRISCOLL
LEON GOBER, JR.
BY
ATTORNEY

ABSTRACT OF THE DISCLOSURE

Improved carbon black wet pelletizing apparatus having an elongated cylindrical conduit with a rigid internal wall surface for containing a wetted mass of the carbon black particles, a rotatable shaft which extends through the conduit along the center line thereof, and a series of rod-shaped agitating members which are equally spaced longitudinally along the shaft. Specifically, the agitating members have sufficient radial extension so that the ratio $d/D$ of the diameter $d$ of the circle transcribed by the tip of the members to the internal diameter $D$ of the conduit is greater than 0.95 but less than 0.995. Additionally, the longitudinal center line spacing of the agitating members does not exceed two times their diameter.

BACKGROUND OF THE INVENTION

Field of the invention

This invention relates to apparatus for agglomerating carbon black to form wet pellets thereof by vigorously agitating carbon black powder in the presence of a liquid pelletizing agent.

Description of the prior art

Carbon black, produced by the thermal decomposition of selected hydrocarbon feedstocks, is generally pelletized to increase its density and to render it more readily handleable in bulk form. One common way of pelletizing carbon black consists of violently agitating the fluffy powder in the presence of a suitable liquid pelletizing agent, such as water, in a stationary cylindrical conduit having a length of four to twelve times its diameter. Agitation of the wetted powder is accomplished by rotation of a shaft which extends through the conduit along the longitudinal center line thereof, the shaft having a series of longitudinally spaced, rod-shaped agitating members which extend radially from the shaft toward the internal circumferential surface of the cylindrical conduit. After formation, the wet pellets of carbon black may be passed out of the pelletizer apparatus into a rotary drier for removal of excess water, thus producing dry pellets.

In the pelletizing apparatus of the prior art, the agitating members only extended to within 0.5 and 1.5 inches of the internal surface of the cylindrical conduit. Thus, if the conduit had a diameter D of 20 inches, the circle transcribed by the tip of the agitating members had a diameter $d$ of between 17 and 19 inches, and the ratio $d/D$ varied between 0.85 and 0.95. A sizable space was left between the tips of the agitation members of the internal wall of the conduit since it was thought by those skilled in the art that formation of a dense, wet cake of carbon black upon the wall of the conduit was necessary to the formation of pellets within the machine, and pellets will not in fact form until the thickness of the cake increases to the point where clearance between the cake and the tip of the members is reduced to between about $\frac{1}{16}$ and $\frac{1}{4}$ of an inch.

There are several disadvantages in operating a process in this manner. As the process proceeds, the dense wet cake of carbon black continues to build up on the internal wall surface of the conduit and as the tips of the agitating members rub over the surface of the cake, large portions thereof break away from the wall of the conduit and fall into the agitation zone for the wetted carbon black powder. This results in frequent, violent vibration which causes excessive wear and tear on the pelletizing apparatus. Another disadvantage is the wearing away of the tip of the agitating members as they constantly rub over the surface of the cake. This results in metallic contamination of the carbon black product and necessitates frequent replacement of the agitating members. Furthermore, wear of the members results in further increase in the thickness of the cake build-up, which in turn causes even more break-away of the cake and aggravates vibration of the apparatus. The agitating members thus frequently become bent and even the axially extending shaft may fail from excessive flexing and/or vibration.

It has recently been proposed to prevent formation of the dense, wet cake upon the wall of the cylindrical conduit by applying a resilient plastic liner to the entire interior surface of the conduit while extending the tips of the agitating members to within $\frac{1}{16}$ to $\frac{1}{4}$ of an inch of the internal circumferential surface of the liner. Installation of the plastic liner is, however, a costly and time consuming procedure, and the $\frac{1}{16}$ to $\frac{1}{4}$ inch spacing between the agitating members is not necessarily attained with ease due to an inability to apply the liner in an even thickness. Consequently, it is not always possible to completely prevent formation of the cake. Furthermore, wear to the tips of the agitating members is not necessarily prevented so that application of the super hard metallic coating to the tips of the members is still required.

SUMMARY OF THE INVENTION

In the present invention, the wet pelletizing apparatus comprises an elongated cylindrical conduit with a rigid internal wall surface of substantially uniform diameter over the length which is in juxtaposition to the longitudinally spaced agitation members. The conduit is provided with an inlet opening at one end for the introduction of carbon black particles and an outlet opening at the other end for the removal of wet agglomerates of the particles. The apparatus also includes a rotatable shaft which extends coaxially into the conduit along its center line and a series of uniformly sized, rod-shaped agitating members are evenly spaced longitudinally along the shaft and extend radially therefrom to the proximity of the inside circumferential surface of the conduit. The longitudinal center line spacing of the agitating members does not exceed about two times their diameter and the ratio $d/D$ of the internal diameter D of the conduit to the diameter, $d$, of the circle transcribed by the tip of the agitating members is greater than 0.95 but not in excess of 0.995.

The agitating members may be arranged in a spiral pattern around the axial shaft so that the pitch angle between one agitating member and the next is within the range of about 15° and 90°. In addition, the outside diameter of the rotatable shaft may have a diameter of one-fifth to four-fifths the inside diameter of the elongate cylindrical conduit. To particular advantage, the agitating members may extend all the way through the rotatable shaft to alleviate the problem of static and dynamic imbalance of the agitator assembly.

When operating the present invention, destructive vibration is greatly reduced since the close spacing between agitating members and between the tips of the members and the wall of the conduit prevents the formation of the dense, wet carbon black cake which falls into the agitation zone. Nonetheless, pelletization of the carbon black proceeds straightway and continues smoothly even though no formation of the cake occurs.

With the close clearance employed between the tips of the agitating members and the conduit wall, it is of course essential that the rotatable shaft-agitating member assembly be dynamically balanced and carefully aligned within the conduit, but such details are readily accomplished by a skilled mechanic.

Employment of the present invention has obviated the necessity of an adherent resilient plastic liner covering the interior of the cylindrical conduit. It has also been found that wear of the tips of the agitating members is greatly reduced since there is no cake for them to rub against. Thus, there is no need to coat the tips of the members with a super hard abrasion resistant coating such as tungsten carbide or ni-chrome.

In accordance with the invention, the cylindrical conduit, rotatable axial shaft, the agitating members and any other parts which are exposed to the wet carbon black may be constructed entirely from corrosion resistant steel, e.g. 316 stainless steel.

BRIEF DESCRIPTION OF THE DRAWINGS

FIG. 1 is a side view, partly in section of one embodiment of the pelletizing aparatus of this invention.

FIG. 2 is a cross-sectional view, somewhat enlarged, of the apparatus of FIG. 1 along the line 2—2.

DESCRIPTION OF PREFERRED EMBODIMENTS

In FIG. 1, an elongated cylindrical conduit 1 is provided with end flanges 2 and end closure plates 3. A rotatable shaft 4 extends coaxially through the conduit 1 and is supported at their end by anti-friction bearings 5. Stuffing boxes 6 seal the interior of the conduit from the outside atmosphere. An inlet duct 7 intercommunicates with the interior of conduit 1 for the purpose of feeding carbon black powder into the conduit, and a discharge duct 8 also intercommunicates with the conduit 1 for removing wet aggregates of carbon black particles from the conduit. A series of rod-shaped agitating members 9 of uniform diameter and length, extend through the shaft 4 and project radially on either side thereof to the proximity of the inside circumferential surface 10 of the conduit 1. A pelletizing liquid is introduced into the cylindrical conduit through an inlet line 11. To operate the apparatus, the shaft 4 is connected to a suitable drive means for rotating the agitating members at a suitable speed for the pelletization of the wet carbon black particles.

As previously stated, the cylindrical conduit 1 may have a length of four to twelve times its diameter, the shaft 4 may have a diameter of ⅕ to ⅘ the internal diameter of the conduit 1, the ratio of the diameter $d/D$ should be greater than 0.95 but not in excess of 0.995 and the center spacing of the agitating members 9 should not exceed about twice the diameter of the members. A typical apparatus of this invention might, then, have a cylindrical conduit 10 feet in length with a 20 inch inside diameter while containing a 4 inch shaft which carries ⅝ inch diameter agitating rods on one inch center spacing and elongated so that the tip ends thereof transcribe a 19¼ inch circle upon rotation of the shaft, the rods being arranged in a spiral pattern having a pitch angle of 22½°.

While the invention has been described with reference to particular materials and apparatus arrangements, it will be understood that other embodiments will become apparent which are within the scope of the invention as defined by the appended claims.

Therefore what is claimed is:

1. In a carbon black wet pelletizing apparatus having an elongated cylindrical conduit with a rigid internal wall surface of essentially uniform diameter, an inlet opening at one end of the conduit for the introduction of carbon black particles and a discharge outlet at the other end of the conduit for the removal of wet aggregates of carbon black particles therefrom, a rotatable shaft which extends through said conduit in coaxial relationship therewith, a series of uniformly sized, rod-shaped agitating members equally spaced longitudinally along said shaft, said rods extending radially outward from the shaft to the proximity of said rigid internal surface of the conduit wall, the improvement for preventing the formation of wet carbon black cake upon the internal surface of said conduit and for reducing wear of the tips of the agitating members, said improvement comprising
  (a) a ratio $d/D$ of greater than 0.95 but less than 0.995 where $d$ is the diameter of the circle transcribed by the tip end of said agitating members and $D$ is the inside diameter of said conduit, and
  (b) the longitudinal center line spacing of said agitating members along said shaft does not exceed about two times the diameter of the members.

2. The apparatus of claim 1 in which the agitating members are arranged in a spiral pattern around the axial shaft and the pitch angle between one agitating member and the next is between about 15° and about 90°.

3. The apparatus of claim 1 in which the agitating members extend through the rotatable shaft.

4. The apparatus of claim 1 in which the outside diameter of the rotatable shaft has a diameter of one-fifth to four-fifths the internal diameter of the elongated cylindrical conduit.

References Cited

UNITED STATES PATENTS

| | | | |
|---|---|---|---|
| 2,213,056 | 8/1940 | Skoog et al. | 18—1 XR |
| 2,288,087 | 6/1942 | Hanson et al. | 18—1 XR |
| 2,306,698 | 12/1942 | Heller. | |
| 3,049,750 | 8/1942 | Austin | 18—1 |
| 3,326,642 | 6/1967 | Ruble | 18—1 XR |
| 3,333,038 | 7/1967 | Walenciak | 18—1 XR |

J. HOWARD FLINT, JR., Primary Examiner